United States Patent
Babu et al.

(10) Patent No.: US 9,955,113 B2
(45) Date of Patent: Apr. 24, 2018

(54) METHOD AND APPARATUS FOR INJECTING PROGRAM MARKERS IN LIVE MEDIA STREAMS

(75) Inventors: Narendra B. Babu, Tamil Nadu (IN); Kiran K. Patibandla, Tamil Nadu (IN); Syed Mohasin Zaki, Tamil Nadu (IN); Jacques Franklin, Tamil Nadu (IN)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 474 days.

(21) Appl. No.: 13/415,260

(22) Filed: Mar. 8, 2012

(65) Prior Publication Data
US 2013/0239136 A1 Sep. 12, 2013

(51) Int. Cl.
*H04N 21/858* (2011.01)
*H04N 21/472* (2011.01)
*H04N 21/433* (2011.01)
*H04N 21/6543* (2011.01)
*H04N 7/025* (2006.01)
*H04N 5/782* (2006.01)

(52) U.S. Cl.
CPC ............ *H04N 7/025* (2013.01); *H04N 5/782* (2013.01); *H04N 21/4334* (2013.01); *H04N 21/47214* (2013.01); *H04N 21/6543* (2013.01); *H04N 21/858* (2013.01)

(58) Field of Classification Search
CPC .. H04N 21/4334; H04N 5/76; H04N 21/4147; H04N 21/44008; H04H 60/13
See application file for complete search history.

(56) References Cited

U.S. PATENT DOCUMENTS

| | | | |
|---|---|---|---|
| 8,209,713 B1* | 6/2012 | Lai ...................... | H04H 60/375 725/10 |
| 2002/0100043 A1* | 7/2002 | Lowthert ............. | H04N 5/4401 725/36 |
| 2004/0010807 A1* | 1/2004 | Urdang et al. ................ | 725/136 |
| 2007/0050823 A1* | 3/2007 | Lee et al. ...................... | 725/80 |

* cited by examiner

*Primary Examiner* — Benjamin R Bruckart
*Assistant Examiner* — Aklil M Tesfaye

(57) ABSTRACT

An approach is provided for injecting program markers in live media steams is presented. A first marker is injected into a live media stream to designate a start of a live program. A second marker is injected a into the live media stream to designate an end of the live program. The live stream with the injected markers is transcoded the for transmission to a set-top box.

20 Claims, 12 Drawing Sheets

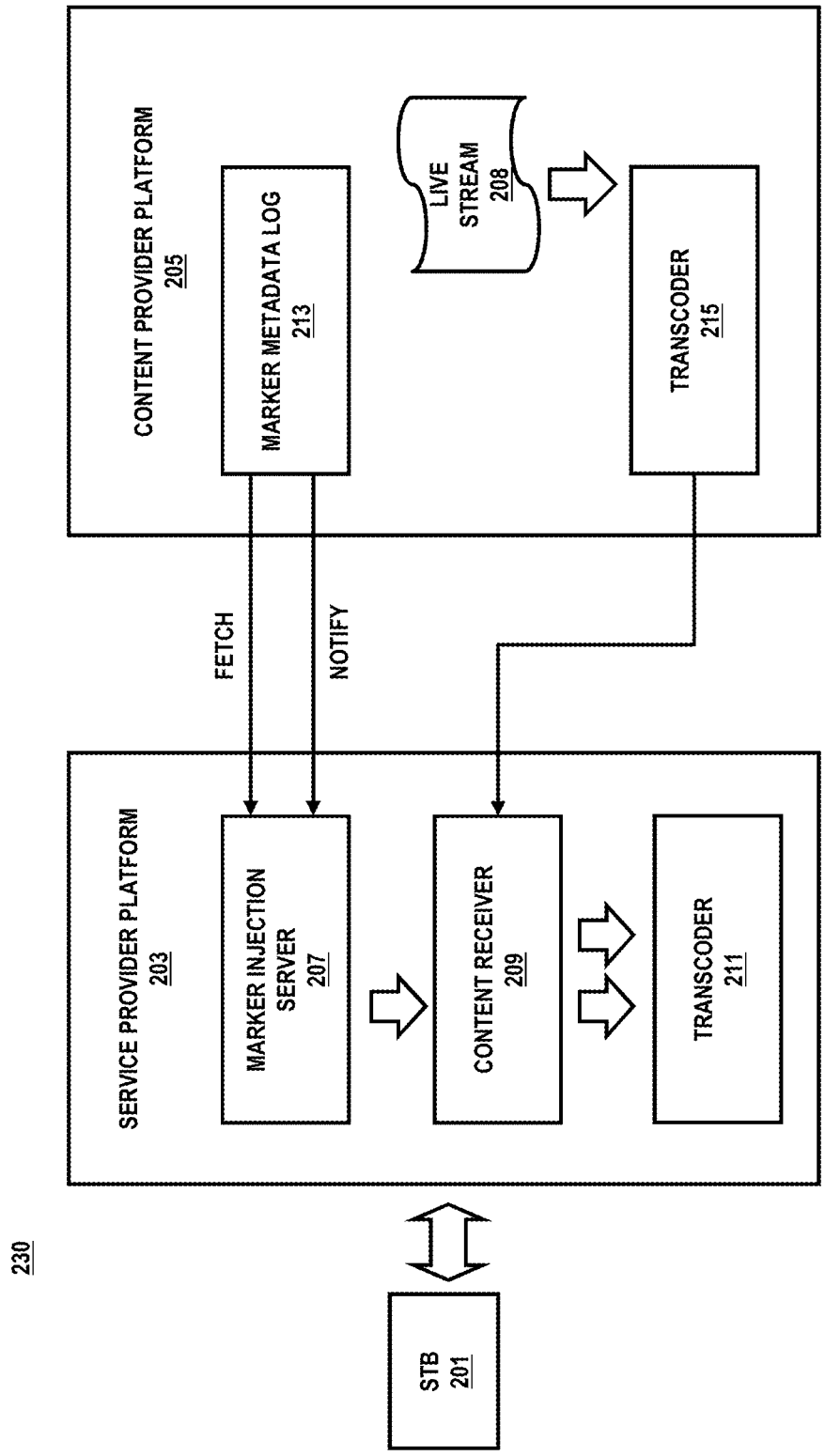

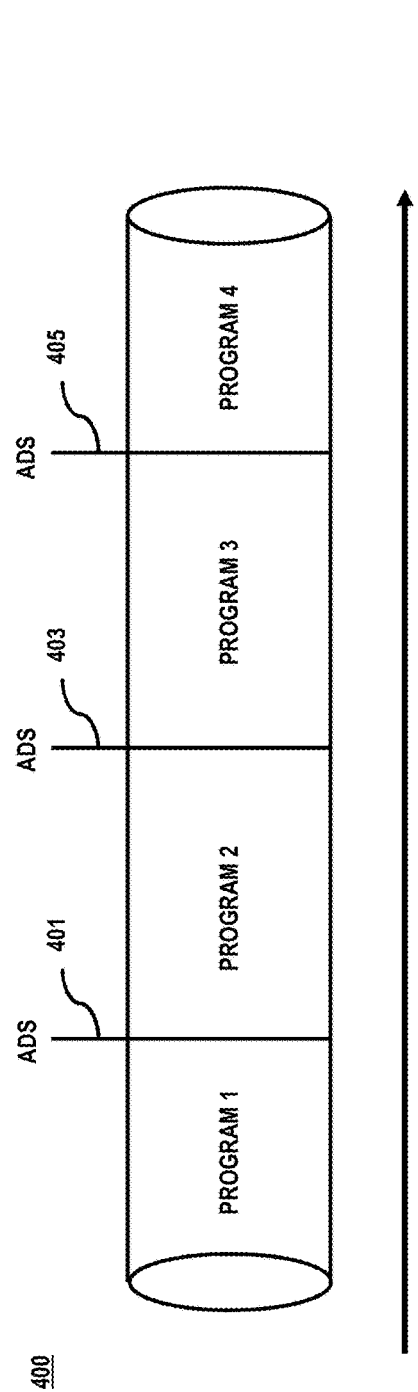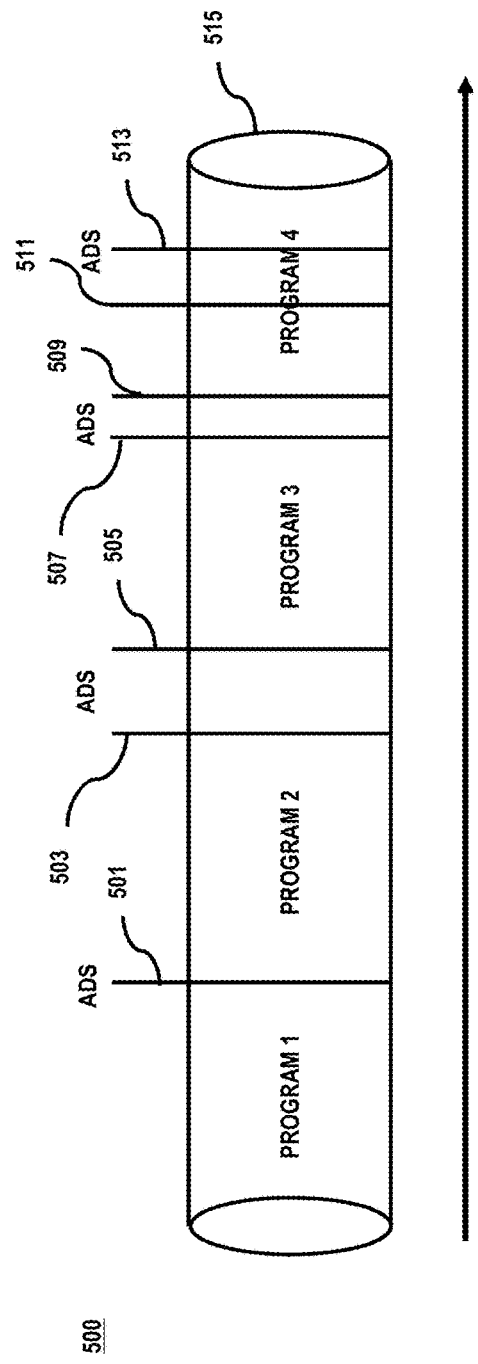

METHOD AND APPARATUS FOR INJECTING PROGRAM MARKERS IN LIVE MEDIA STREAMS

BACKGROUND INFORMATION

With the advent of computers, interactive electronic communications, and the Internet, as well as advances in the digital realm of consumer information, has come a reinvention of conventional entertainment and communication services to enhance programming, recording, and viewing of multimedia, such as broadcast television programs. Traditionally, broadcast media, being based on pre-computer age technology, has developed on its own path, without any regard to other media systems. With readily available, cost-effective broadband services, bandwidth intensive applications, such as audio and video streaming, have become viable mediums. Also, there has been substantial growth in the use of set-top boxes (STBs) equipped with digital video recording capabilities. Through the digital video recorder (DVR), a user may record content, such as a television program, to a memory medium so that the program may be viewed by the user at a more convenient time. Unfortunately, the ability to record live broadcast programs is rather inflexible in that such programs cannot be pre-processed to facilitate the introduction of supplemental content, navigation through the program, or scheduling.

Therefore, there is a need for an approach that provides flexible, efficient techniques to manipulate broadcast programs.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 2B is a diagram of a system capable of determining content program time boundaries using injected program markers in live media streams, wherein the service provider injects marker metadata, according to an exemplary embodiment;

FIG. 4 is an illustration of a live stream with marker metadata using a single marker approach, according to an exemplary embodiment;

FIG. 5 is an illustration of a live stream with marker metadata using a multiple marker approach, according to an exemplary embodiment;

DESCRIPTION OF THE PREFERRED EMBODIMENT

A preferred apparatus, method, and software for determining program time boundaries are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing content (e.g., audio/video (AV)) signals for presentation to a user, such as a home communication terminal (HCT), a digital home communication terminal (DHCT), a stand-alone personal video recorder (PVR), a television set, a digital video disc (DVD) player, a video-enabled phone, an audio/video-enabled personal digital assistant (PDA), and/or a personal computer (PC), as well as other like technologies and customer premises equipment (CPE).

Figure 1A:
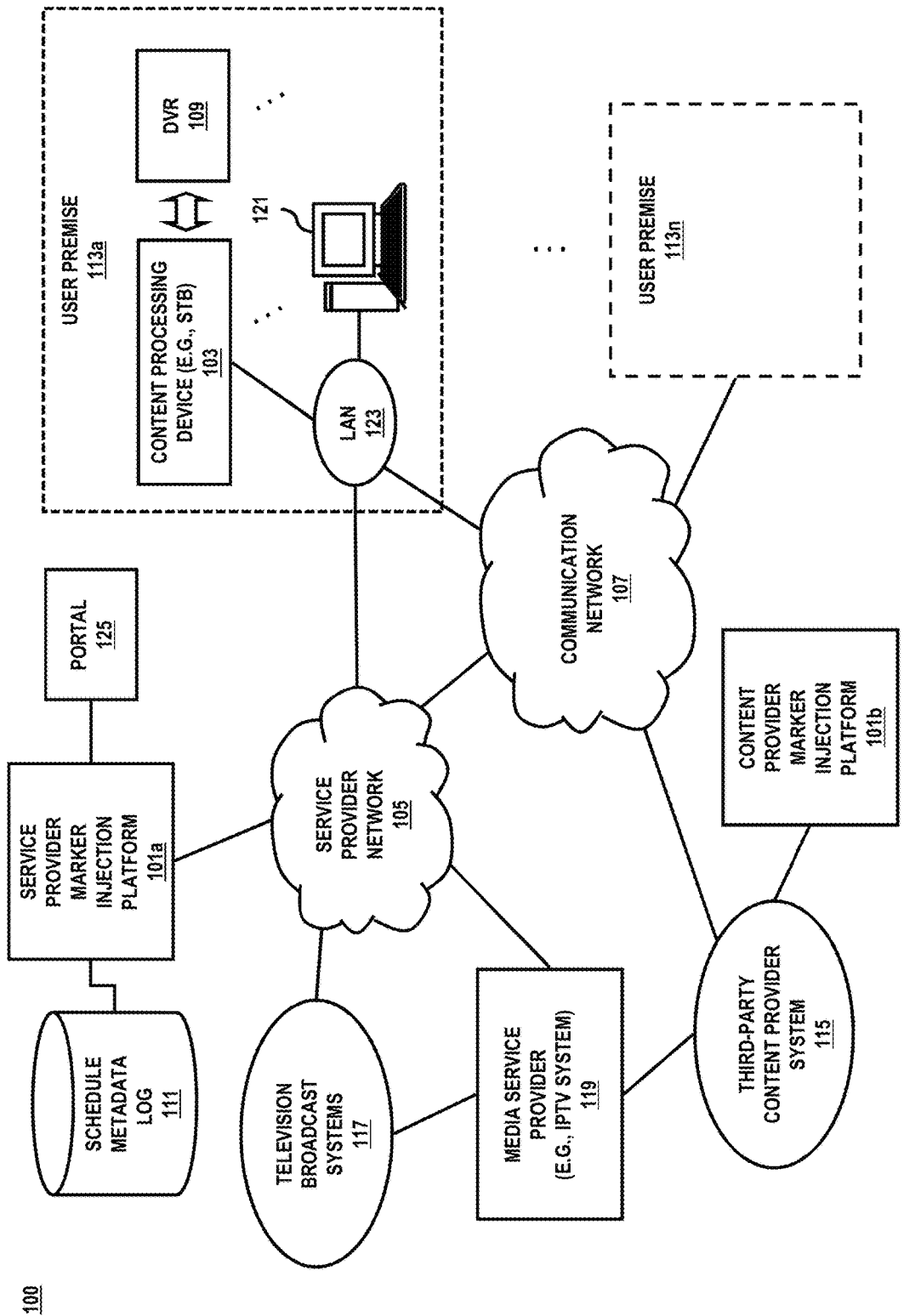
FIG. 1A is a diagram of a system capable of determining content program time boundaries, according to an exemplary embodiment.

FIG. 1A is a diagram of a system capable of determining program time boundaries, according to an exemplary embodiment. For the purposes of illustration, system 100 is described with respect to service provider marker injection platform (or service provider platform) 101a that is configured to interface with content processing devices 103 through service provider network 105 and/or communication network 107. As used herein, a DVR or PRV (personal video recorder) device can be either a standalone DVR 109 or an integrated unit of content processing device and DVR. System 100 may be configured to support increased flexibility and efficiency in the way that programs (particularly live broadcast programs) are scheduled for recording by using an approach for determining program time boundaries. As such, users are not limited to traditional methods of recording content time based (e.g., in a scheduled time slot). As will be more fully described, service provider platform 101a permits markers designating program boundaries to be injected or inserted into a live stream, thereby enabling increased flexibility and efficiency in the way that program time boundaries are determined by a DVR. Also, DVRs can be standalone, combined with STBs, or implemented using a personal computer (i.e., PC-based device); hence, "DVR resources" would refer to system resources of these various implementations. While specific reference will be made hereto, it is contemplated that system 100 may embody many forms and include multiple and/or alternative components and facilities.

It is observed that television remains the prevalent global medium for entertainment and information as individuals spend a great deal of time tuning into televised media. With the introduction of the DVR, consumers are able to record content, such as televised media, to a memory medium so that the content may be accessed at a later time. Digital video recording systems offer consumers the ability to watch their favorite programs at a more convenient time by appropriately scheduling recording and later accessing of various programs for viewing. Typically, such programming is set to record with respect to slots of time. As an example of a typical programming process, a DVR retrieves time slot information for each program or episode a user requests to be recorded. That is, the DVR retrieves out-of-band program metadata (e.g., electronic program guide (EPG)) from a backend server to identify the program start time. Unfortunately, due to sync problems between the linear content (e.g., live media or program stream) and the program metadata, DVRs frequently miss or fail to record portions of the program content (and also record unnecessary portions). To address this issue, users frequently pad, or add an additional time frame to the allotted time slot. This padding is an inefficient approach because frequently the additional time is not necessary and often times the additional time is inadequate (i.e., the program content exceeds the allotted time slot and the additional time).

Further, padding may prevent another program from being recorded by the DVR because padding may increase the number of tuners required to decode the live stream. Specifically, the padding of time to each time slot prevents another program from being recorded when a first program (or set of programs) on a first channel (or set of channels) and a second program (or set of programs) on a second channel (or set of channels) to be recorded are in adjoining time slots. That is, the use of padding may potentially double the number of tuners required if program content is in adjoining time slots and different channels. By way of example, a user wishing to record a program A on channel A at 7 P.M. and a program B on channel B at 8 P.M. would require only one tuner if no padding were used and two tuners if padding is used. In the same manner, recording two programs at once on different channels at adjoining time slots would require four tuners if padding is used.

It is further recognized that users may wish to record programs with fewer or any supplemental content (e.g., advertisements, promotions, emergency broadcasts, urgent news, etc.) Traditionally, to avoid advertisements, users would be to required fast forward though such content, which as explained is a cumbersome task. Alternatively, the use of markers injected into a live stream may facilitate the insertion of supplemental content. For example, advertisements and promotional content targeted to a user of a DVR may be inserted into recorded program content. It is contemplated that the inserted content may be retrieved after recording the program content (e.g., on-demand), and/or from a different source (e.g., from service provider platform 101*a*).

Thus, the approach of system 100, according to certain embodiments, stems from the recognition that service providers and ultimately the consumers can benefit from program markers that are injected into the live stream (i.e., in-band) to provide detectable program boundaries.

As shown, system 100 includes service provider platform 101*a* (and content provider platform 101*b*) that may be configured to retrieve program content (i.e., live streams), fetch or request program time boundaries from schedule metadata log 111, and inject or insert marker delimiters into the live streams. In this manner, system 100 allows a transmission of program content to be transcoded (or in-band) with metadata and for the triggering of a recording in by content processing device(s) 103 in the respective user premise (e.g., 113*a*-113*n*).

In one embodiment, service provider platform 101*a* obtains schedule metadata from schedule metadata log 111, and retrieves media content and program timing information from a third-party content provider system 115. The program content is then transmitted, whereby markers embedded in the content indicate, for instance, a start and end time for each program to a content processing device 103. Service provider platform 101*a* may also retrieve media content from television broadcast systems 117, a media service provider (e.g., IPTV system) 119, a third-party content provider system 115, a computing device 121 (via a LAN 123), and the like. The service provider platform 101*a* may retain a current list of programs with each associated time slot; additionally or alternative, the platform 101*a* may retrieve or update the list of programs from the schedule metadata log 111. It is noted that this process may be substantially performed by content provider marker injection platform 101*b*.

Content processing device 103 may log into service provider platform 101*a* using predefined user/account credentials. Content processing device 103 may retrieve program content with markers designating or denoting time boundaries from, for example, service provider platform 101*a*. The processing by content processing device 103 of the retrieved program content with markers (i.e., transcoded transmission) is discussed further with respect to FIG. 7.

In certain embodiments, a portal 125 interfaces with service provider platform 101*a* to permit access by users via content processing device 103 and/or computing device 121 (e.g., laptop, desktop, web appliance, netbook, etc.). Portal 125 provides, for example, a web-based user interface to allow users to set and update user profile information and DVR related settings.

By way of example, service provider platform 101*a* (or content provider platform 101*b*) may be configured to communicate using one or more of networks 105 and 107. System 107 can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks, etc.), terrestrial broadcasting networks, provider specific networks (e.g., fiber optic networks, cable networks, etc), and the like. Such networks may also utilize any suitable protocol supportive of data communications, e.g., transmission control protocol (TCP), internet protocol (IP), file transfer protocol (FTP), telnet, hypertext transfer protocol (HTTP), hypertext transfer protocol secure (HTTPS), asynchronous transfer mode (ATM), socket connections, Ethernet, frame relay, and the like, to connect content processing devices 103 to various sources of media content, such as one or more third-party content provider systems 115.

Although depicted in FIG. 1 as separate networks, communication network 107 may be completely or partially contained within service provider network 105. For example, service provider network 105 may include facilities to provide for transport of packet-based communications.

According to certain embodiments, content processing devices 103 and/or computing devices 121 may be configured to communicate over one or more local area networks (LANs) corresponding to user premises 113a-113n. In this manner, routers (not shown) may be used for establishing and operating, or at least connecting to, a network such as a "home" network or LAN 123, and is used to route communications within user premises 113a-113n. For example, content processing device 103 may be a set-top box communicatively coupled to LAN 123 via a router and a coaxial cable, whereas computing devices 121 may be connected to LAN 123 via a router and a wireless connection, a network cable (e.g., Ethernet cable), and/or the like. It is noted, however, that in certain embodiments content processing device 103 may be configured to establish connectivity with LAN 123 via one or more wireless connections. Further, content processing device 103 and computing device 121 may be uniquely identified by LAN 123 via any suitable addressing scheme. For example, LAN 123 may utilize the dynamic host configuration protocol (DHCP) to dynamically assign "private" DHCP internet protocol (IP) addresses to content processing device 103 and computing devices 121, i.e., IP addresses that are accessible to devices such as devices 103 and 115 that are part of LAN 123 facilitated via router, i.e., connected to a router.

Accordingly, it is noted that user premises 113a-113n may be geospatially associated with one or more regions, as well as one or more user accounts. As such, content processing devices 103 associated with these user premises 113a-113n may be configured to communicate with and receive information from service provider platform 101a. This information may include content (e.g., media content) or user profile information among many other things. Additionally, content processing devices 103 associated with these user premises 113a-113n may be configured to communicate with and receive signals and/or data streams from media service provider (MSP) 119 (or other transmission facility, e.g., third-party content provider system 115). These signals may include media content retrieved over a data network (e.g., service provider network 105 and/or communication network 107), as well as conventional video broadcast content.

As used herein, media content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or image media), and/or any other equivalent media form. In this manner, MSP 119 may provide (in addition to their own media content) content obtained from sources, such as one or more third-party content provider systems 115, one or more television broadcast systems 117, etc., as well as content available via one or more communication networks 107, etc. While system 100 is illustrated in FIG. 1, the exemplary components are not intended to be limiting, and indeed, additional or alternative components and/or implementations may be utilized.

Figure 1B:
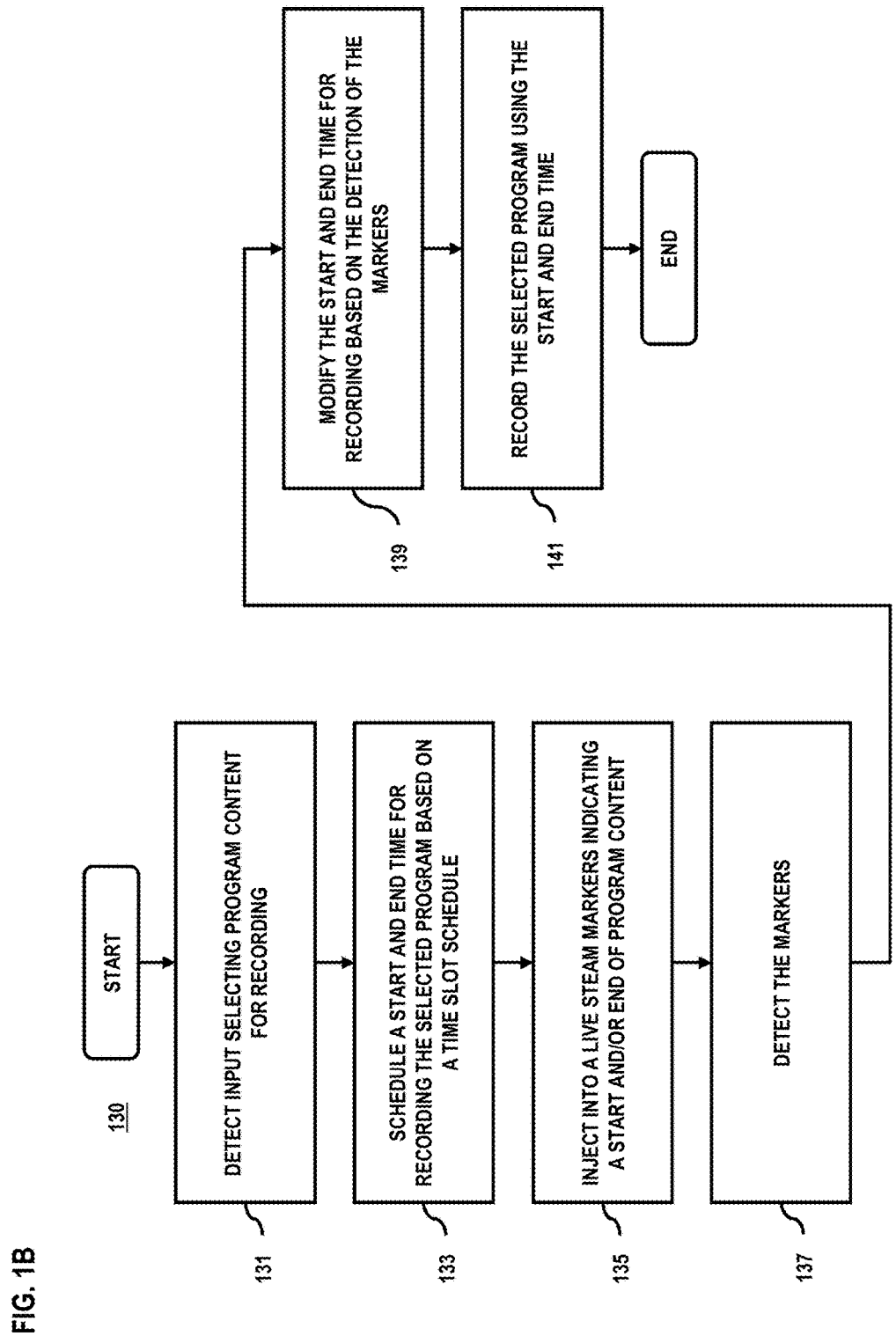
FIG. 1B is flowchart of a process of determining content program time boundaries using injected program markers in live media streams, according to an exemplary embodiment.

FIG. 1B is flowchart of a process 130 of an exemplary use of the system 100 for determining content program time boundaries using injected program markers in live media streams, according to an exemplary embodiment. For illustrative purposes, the process 130 is described with respect to FIG. 1A. It is noted that the steps of the process may be performed in any suitable order, as well as combined or separated in any suitable manner. It is noted that the service provider platform 101a and/or the content provider platform 101b may be configured to perform process 130.

In step 131, the process 130 detects an input selecting a program or media content for recording. By way of example, the DVR 109 retrieves (i.e., out-of-band) schedule metadata from the service provider platform 101a (or schedule metadata log 111), displays a plurality of selectable program content for recording and detects a user input (e.g., keyboard, touchscreen, etc.). It is contemplated that the selection of a program may also be performed by accessing the portal 125 using, for example, computing device 121. Next, the process 130, per step 133, schedules a start and end time for recording the selected program based on a time slot schedule retrieved from the service provider platform 101a (or schedule metadata log 111). For example, an hour long program scheduled to start on a particular hour (e.g., 8 P.M.) would have a start time of the particular hour (e.g., 8 P.M.) and an end time of the particular hour plus the scheduled duration of the show (e.g., 9 P.M.). In this manner, an initial start and stop time is selected to insure a recording during the scheduled program time. It is contemplated that the initial start and end time may include padding. The significance of an initial start and end time is discussed further with regards to step 139.

With the initial start and end times schedule the process 130 injects, as in step 135, into a live stream, markers indicating a start and/or end of program content. In the example, service provider platform 101a (or the content provider platform 101b) injects markers (i.e., transmits a transcoded transmission) that indicate a start or end of program or media content. That is, the markers designate a separation between program or media content and/or supplemental content. The insertion of the markers may be by various means, such as transmission using a frequency channel not used by program content, transmission during a time not used by program content, or a combination thereof. In this manner, the process 130 may be performed on program content delivered by television broadcast systems 117 (i.e., terrestrial televisions signals), a media service provider 119 (e.g., IPTV system), a third-party content provider system 115, and the like.

With the markers inserted or injected into the live stream, the process 130, per step 137, detects the markers. That is, content processing device 103 and/or DVR 109 retrieve the transcoded transmission containing media or program content and in-stream markers containing metadata designated start and end times.

Once the process 130 detects the markers, the process 130 modifies, per step 139, the start and end time for recording based on the detection of the markers. That is, the markers notify a scheduler of an accurate start and stop time for program content that takes into account delays caused by, for example, sporting events exceeding their respective time slot, special or emergency broadcasting interruptions (e.g., urgent news, severe weather warnings, etc.), and the like. In this manner, the process 130 determines a start and end time for the selected program content. Once the start and end times are selected, the process 130 records the selected program using the start and end time. It is noted that the process 130 may include the use of initial start and end times (as discussed with reference to step 133) to determine adequate recording resources (e.g., data storage, tuner access, programming access, etc.) and/or to allow recording in the event that the process 130 does not detect the markers, as in step 137. In this manner, the process 130 allows users immediate feedback regarding whether the system 100 has adequate resources upon the detection of a user selecting to record, as in step 141, a program, and may record program content despite failing to detect one or more markers.

Figure 2A:
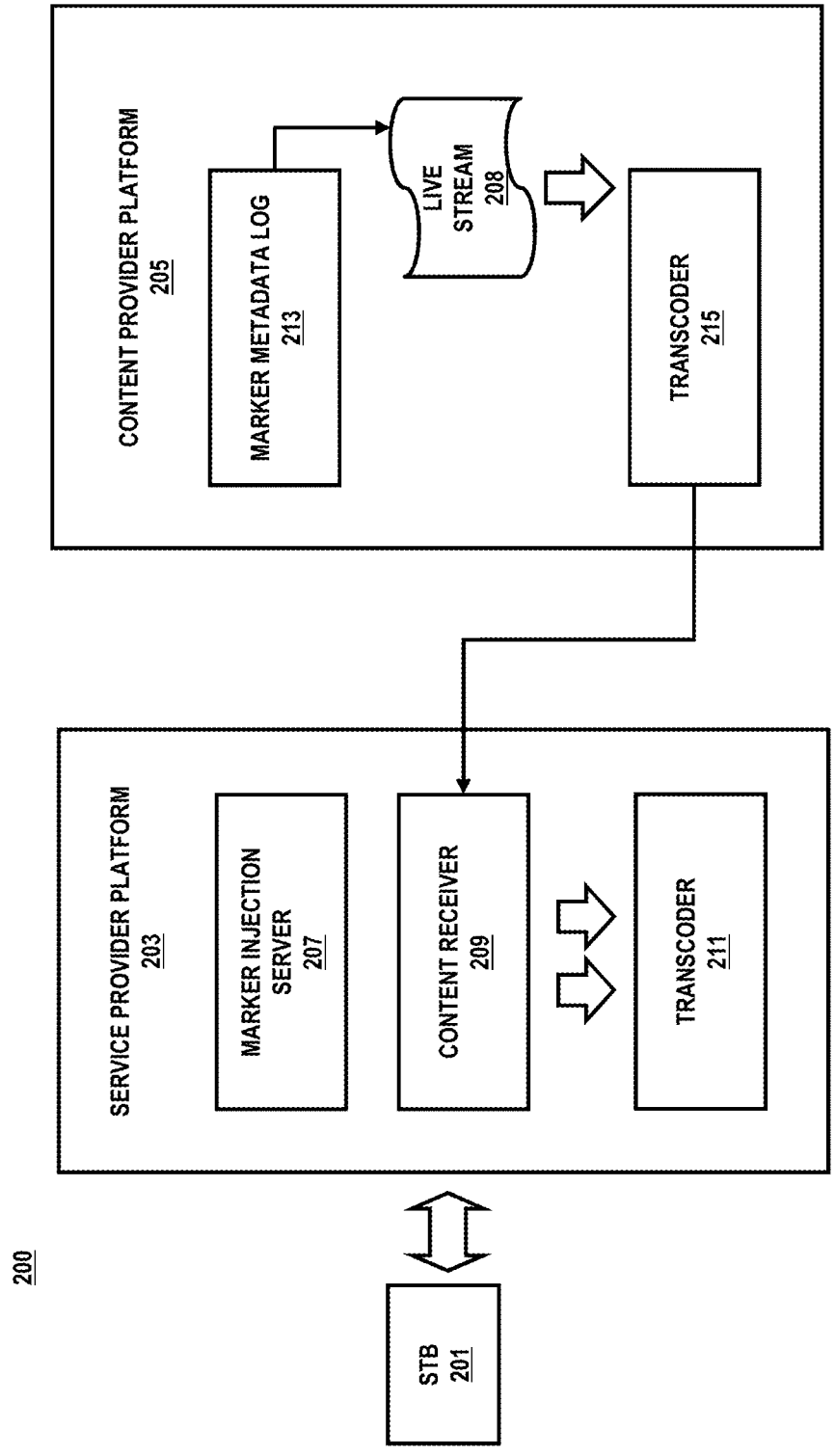
FIG. 2A is a diagram of a system capable of determining content program time boundaries using injected program markers in live media streams, wherein the content provider injects marker metadata, according to an exemplary embodiment.

FIGS. 2A and 2B are diagrams of a system capable of determining content program time boundaries, according to an exemplary embodiment. FIG. 2A shows a system wherein the content provider platform 101*a* injects marker metadata. FIG. 2B shows a system wherein the service provider platform 101*b* injects marker metadata. The systems 200 and 230 include a set top box (STB) 201 (e.g., content processing device 103), service provider platform 203 (e.g., service provider platform 101*a*), and a content provider platform 205 (e.g., content provider platform 101*b*) which each may comprise computing hardware (such as described with respect to FIGS. 10 and 11), as well as include one or more component configured to execute the processes describe herein for facilitating efficient techniques to accurately determine content program time boundaries. The service provider platform 203 includes a marker injection server 207 configured to inject markers into a live stream 208, a content receiver 209 configured to receive live stream 208, and a transcoder 211 for converting data from one encoding to another. The content provider platform 205 includes a marker metadata log 213, and a transcoder 215 for converting data from one encoding to another.

FIG. 2A shows a system 200, where the STB 201 receives program content (i.e., live stream 208) with injected markers from a service provider platform 203, wherein the markers are injected by the content provider platform 205. In this embodiment, marker metadata is inserted directly into live stream 208 by the content provider platform 205, and converted by transcoder 215 for transmission to service provider platform 203. The service provider platform 203 then converts or transcodes the live stream 208 for transmission to the STB 201.

FIG. 2B shows a system 230, where the STB 201 receives program content (i.e., live stream 208) with injected markers from a service provider platform 203, wherein the markers are injected by the service provider platform 203. In this embodiment, content provider platform 205 sends marker metadata and the live stream 208 to the service provider platform 203. In one embodiment, the marker injection server 207 requests, or polls the marker metadata log 213. In another embodiment, the content provider platform 205 sends marker metadata periodically (e.g., monthly) to the service provider platform 203 along with notifications of any changes as they occur. In this manner, the marker injection server 207 retrieves the marker metadata from the marker metadata log 213 to inject into the live stream 208 received from transcoder 215. The live stream 208 with the injected markers is then converted for transmission to the STB 201.

Figure 3:
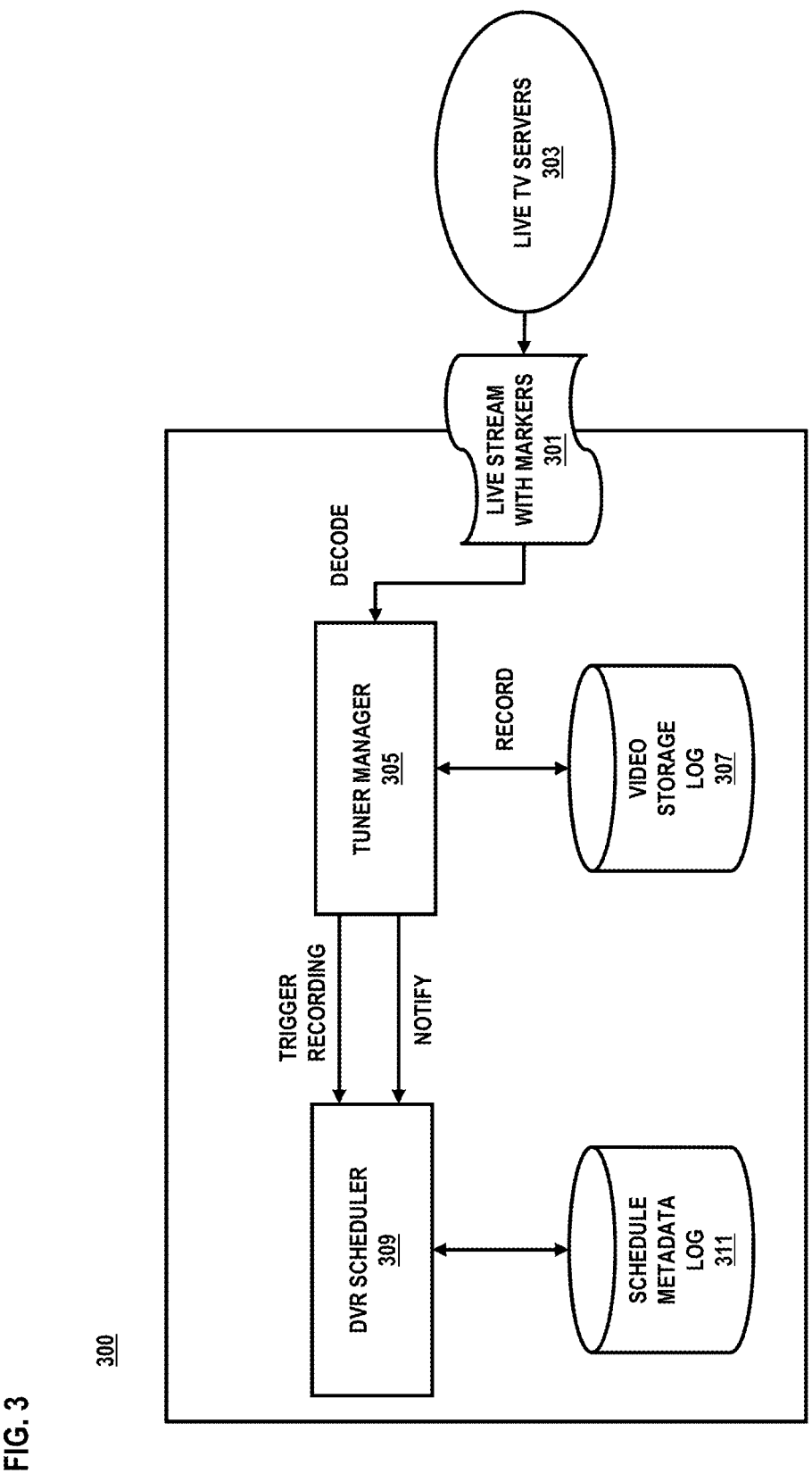
FIG. 3 is a diagram of a system capable of determining content program time boundaries from a live stream with marker metadata, according to an exemplary embodiment.

FIG. 3 is a diagram of a system 300 capable of determining content program time boundaries from a live stream 301 with marker metadata, according to an exemplary embodiment. The system 300 includes live TV servers 303, a tuner manager 305, a video storage log 307, a DVR scheduler 309, and a schedule metadata log 311. Live TV servers 303 include any device that may send media content containing a live stream 301 with markers (e.g., service provider platform 101*a*, content provider platform 101*b*, media service provider 119, third-party content provider system 115, television broadcast systems 117, service provider platform 203, etc.) The tuner manager 305 controls one or more tuners capable of converting the program content transmission into a processed signal used to produce sound and pictures. In one embodiment, the tuner manager 305 must allocate a tuner to a specific channel to detect the markers associated to the specific channel. In another embodiment, the markers may be detected without having a tuner allocated to the specific channel, for example, marker data for a plurality of channels may be inserted into a single channel. The tuner manager 305 also allocates one or more tuners to record a live stream 301 and store the recording in video storage 307 log. The DVR scheduler 309 detects the markers contained in the live stream 301, schedules recordings based on schedule metadata, and updates the schedule metadata log 311 based on the markers contained in the live stream 301. That is, the schedule metadata log 311 may include initial start and end times based on time slots (i.e., out-of-band metadata), and schedule metadata is updated by the DVR scheduler 309 using markers detected in the live stream 301 (i.e., in-band metadata).

FIG. 4 is an illustration of a live stream 400 with marker metadata using a single marker approach, according to an exemplary embodiment. The live stream 400 includes markers 401, 403, and 405. Each marker indicates both a start and an end to program content. For example, marker 401 indicates an end time for program 1 and a start time for program 2, marker 403 indicates an end time for program 2 and a start time for program 3, marker 405 indicates an end time for program 3 and a start time for program 4, and so forth. As shown in FIG. 4, it is contemplated that programs may be separated by supplemental content, such as advertisements or ads.

FIG. 5 is an illustration of a live stream 500 with marker metadata using a multiple marker approach, according to an exemplary embodiment. The live stream 500 includes markers 501, 503, 505, 507, 509, 511, 513, and 515. Each marker indicates either a start, an end, or a start and an end to program content. By way of example, marker 501 indicates an end time for program 1 and a start time for program 2, marker 503 indicates an end time for program 2, marker 505 indicates a start time for program 3 (with advertisements between markers 503 and 505), marker 507 indicates an end time for program 3 and marker 509 indicates a start time for program 4 (with advertisements between markers 507 and 509), and so forth. Additionally, markers may indicate the start and end of supplemental content (or advertisement content) contained in program content. For example, marker 511 indicates the start of supplemental content within program 4, and marker 513 indicates the end of supplemental content (and the beginning of a segment of feature program content). In this manner, markers may be used to separate supplemental content between program content (e.g., advertisement content between markers 503 and 505) and also supplemental content within program content (e.g., advertisement content between markers 511 and 513). It is also contemplated that markers may be used to separate supplemental content. In one example, markers are used to separate some advertisements (e.g., premium advertisements) from other advertisements (e.g., non-preferred advertisements). In another example, markers are used to separate one type of supplemental content (e.g., advertisement) from another type of supplemental content (e.g., urgent news). It is contemplated that markers may be used to selectively skip (i.e., not playback) (or not record) some supplemental content, but record (and playback) other supplemental content.

Figure 6:
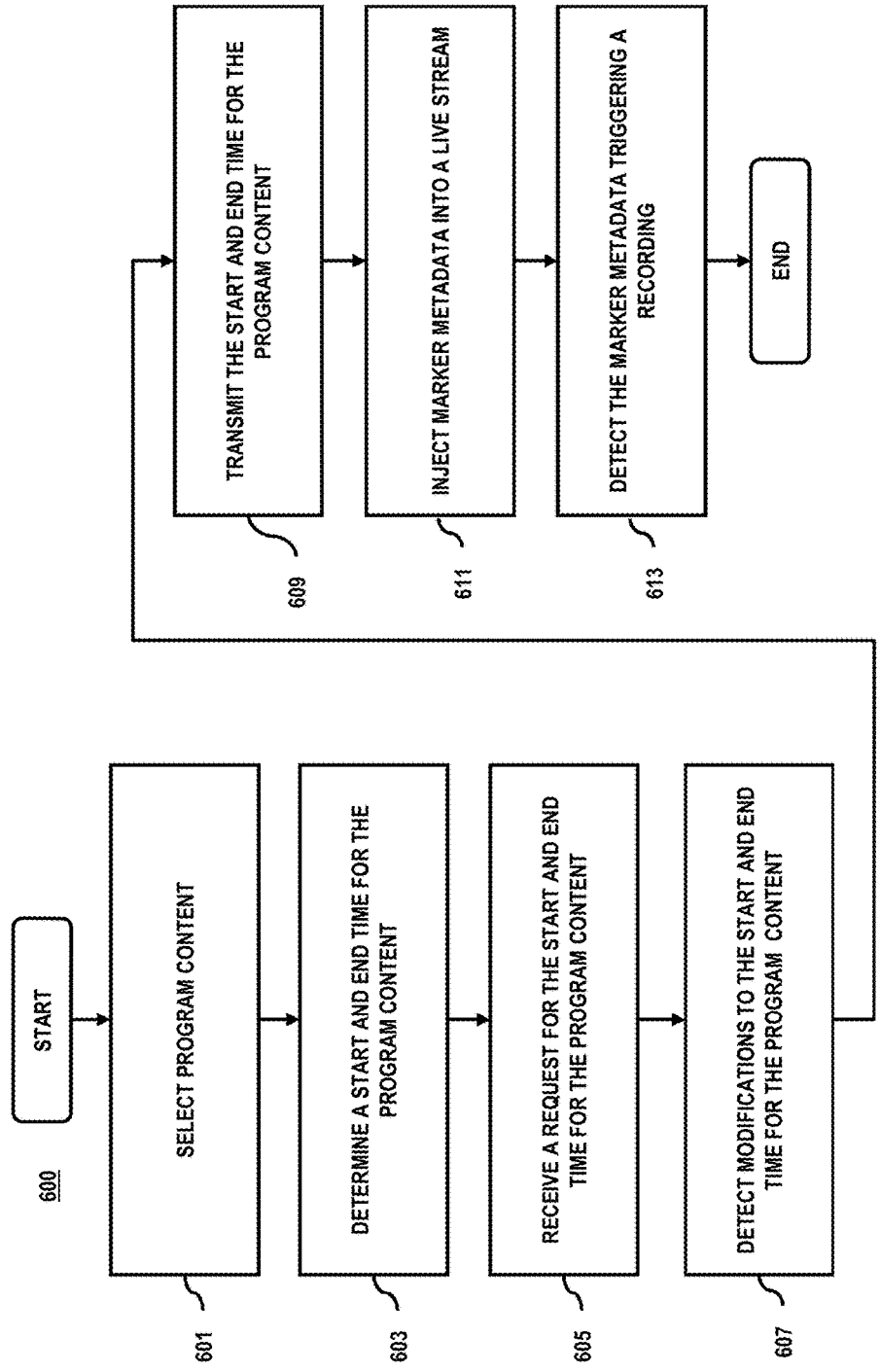
FIG. 6 is flowchart of a process of injecting marker metadata into a live stream, according to an exemplary embodiment.

FIG. 6 is flowchart of a process of injecting marker metadata into a live stream, according to an exemplary embodiment. The exemplary process 600 begins, per step 601, with a selection of program content. That is, a user selects program content using a STP (e.g., DVR 109, STB 201, DVR scheduler 403, etc.). Although, the program content may be based on scheduled time slots (e.g., hourly, semi-hourly), the user may be presented a graphical user interface (GUI) listing programs without reference to a time slot. Such a GUI is discussed further with respect to FIG. 9.

Once the process 600 receives the selected program content the process 600, as in step 603, determines a start and end time for the program content. The initial start and end time is determined using out-of-band scheduling metadata (e.g., hourly or semi-hourly time slot, EPG, etc.) Such information may be stored, for example, in a schedule metadata log 111, service provider platform 101a (or 203), content provider platform 101b (or 205), DVR 109 (or STB 201), schedule metadata log 311, and the like. The determination of start and end times for the program content (or processing of metadata) may be performed by, for example, service provider platform 101a (or 203), content provider platform 101b (or 205), DVR 109 (or STB 201), schedule metadata log 311, and the like.

With the initial start and end time for the program content determined, the process 600 next, as in step 605, receives a request for the start and end time for the program content. In one embodiment (e.g., system 200 in FIG. 2A), the content provider platform 101b injects the marker metadata into the media content (i.e., live stream) and step 605 is omitted as superfluous. In another embodiment (e.g., system 230 in FIG. 2B), the content provider platform 101b receives a request, such as a request to notify the requester of changes to the start and end times of the program content, or a request (or poll) to provide current start and end times for the program content. In this manner, process 600 enables the injection of markers into the live stream by, for example, service provider platform 101a (or 203).

Next, the process 600 detects, per step 607, modifications to the start and end time for the program content. As noted, modifications to a start and end time of a program may be due to various reasons such as delays in previous content and/or changes in supplemental content. It is contemplated that such modifications may be predicted or inputted by a content provider (e.g., third-party content provider system 115, television broadcast systems 117, etc.), or detected by device such as service provider platform 101a (or 203). That is, in a first example, a content provider may cause a break in the feature programming (e.g., the advertisement between markers 511 and 513) and denote such break by sending a notification to, for example, service provider platform 101a (or 203). In another example, a device, such as service provider platform 101a (or 203), detects the advertisement between markers 511 and 513 (e.g., by input from a user, or by use of an automated detection scheme) and sends notification to another device (or injects a marker into the live stream).

With the modification to the start and end time detected, the process 600, transmits, as in step 609, the start and end time for the program content. In a first embodiment (e.g., system 200 in FIG. 2A), the transmittal is performed by the insertion, as in step 611 (rendering step 609 superfluous), of markers into media content. In another embodiment (e.g., system 230 in FIG. 2B), the transmittal is performed by the sending of notification of a start and end time to another device (e.g., service provider platform 101a (or 203), which injects, per step 611, the markers into program content. The live stream with injected markers may then be detected, as in step 613, by a STB (e.g., STB 201, system 300, etc.), triggering a recording. The detection of the marker metadata and triggering of step 613 is discussed further with respect to FIG. 7.

Figure 7:
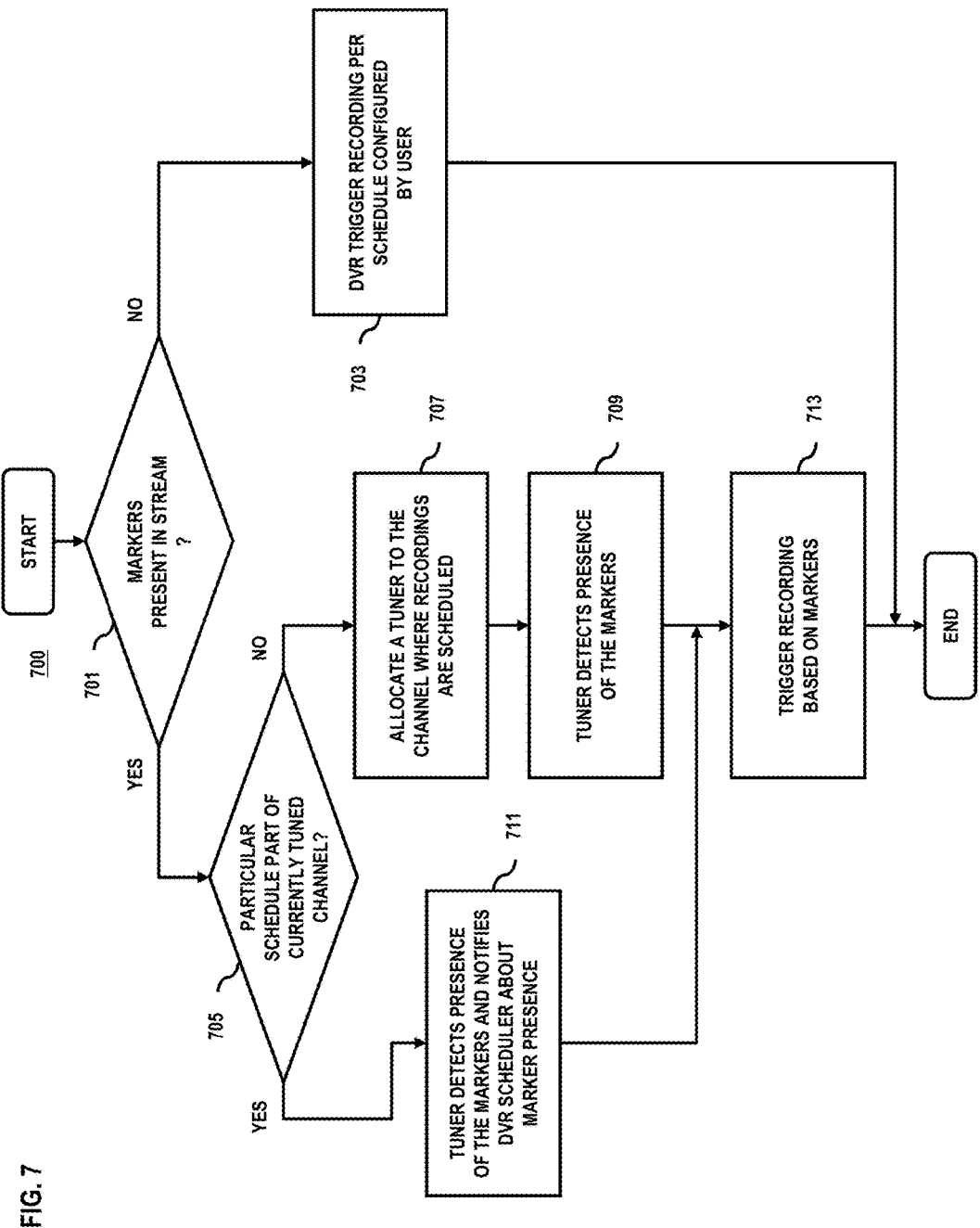
FIG. 7 is flowchart of a process of determining content program time boundaries based on marker metadata, according to an exemplary embodiment.

FIG. 7 is flowchart of a process 700 of determining content program time boundaries based on marker metadata, according to an exemplary embodiment. For the purpose of illustration, the processes are described with respect to FIGS. 1, 3, and 8. It is noted that the steps of the processes may be performed in any suitable order, as well as combined or separated in any suitable manner. Additionally, components (e.g., content processing device 103, DVR 109, tuner manger 305, DVR scheduler 309, content processing device 800, etc.) shown in FIGS. 1 and 3 may be used to implement process 700.

At step 701, process 700 determines whether one or more markers have been detected in a live stream. That is, some program or media content may not include markers, or may include markers process 700 is not configured to detect. Thus, if process 700 does not detect markers in the stream, the process 700 triggers, as in step 703, a DVR 109 (or tuner manager 305) to record a program per a schedule configured by user (or using out-of-band metadata retrieved from a backend server). That is, since markers have not been detected, the process 700 is unable to benefit from the use of markers and thus must record based on a schedule configured by a user. As used herein, schedule configured by a user means a time slot (e.g., hourly, semi-hourly) that may also include the use of padding.

If the process detects markers in the stream, then the process 700 determines, as in step 705, whether the particular schedule specifying one or more recordings of live media streams on a channel is part of a currently tuned channel. That is, if the channel does contain program content selected for recording (and thus part of the particular schedule) then the process 700, detects presence of the markers, as in step 711, notifies the DVR scheduler 309 about marker presence triggering, as in step 713, the recording based on the markers. Alternatively, if the channel does not contain program content selected for recording (and thus not part of the particular schedule) then the process 700, allocates, as in step 707, a tuner to the channel where recordings are scheduled. In this manner, the one (or more) tuners accessible to process 700 are allocated to detecting markers and recording content.

Once the tuner is allocated to a channel where recordings are scheduled, the tuner detects, per step 709, the presence of the markers, and triggers, as in step 713, recordings based on the markers.

Figure 8:
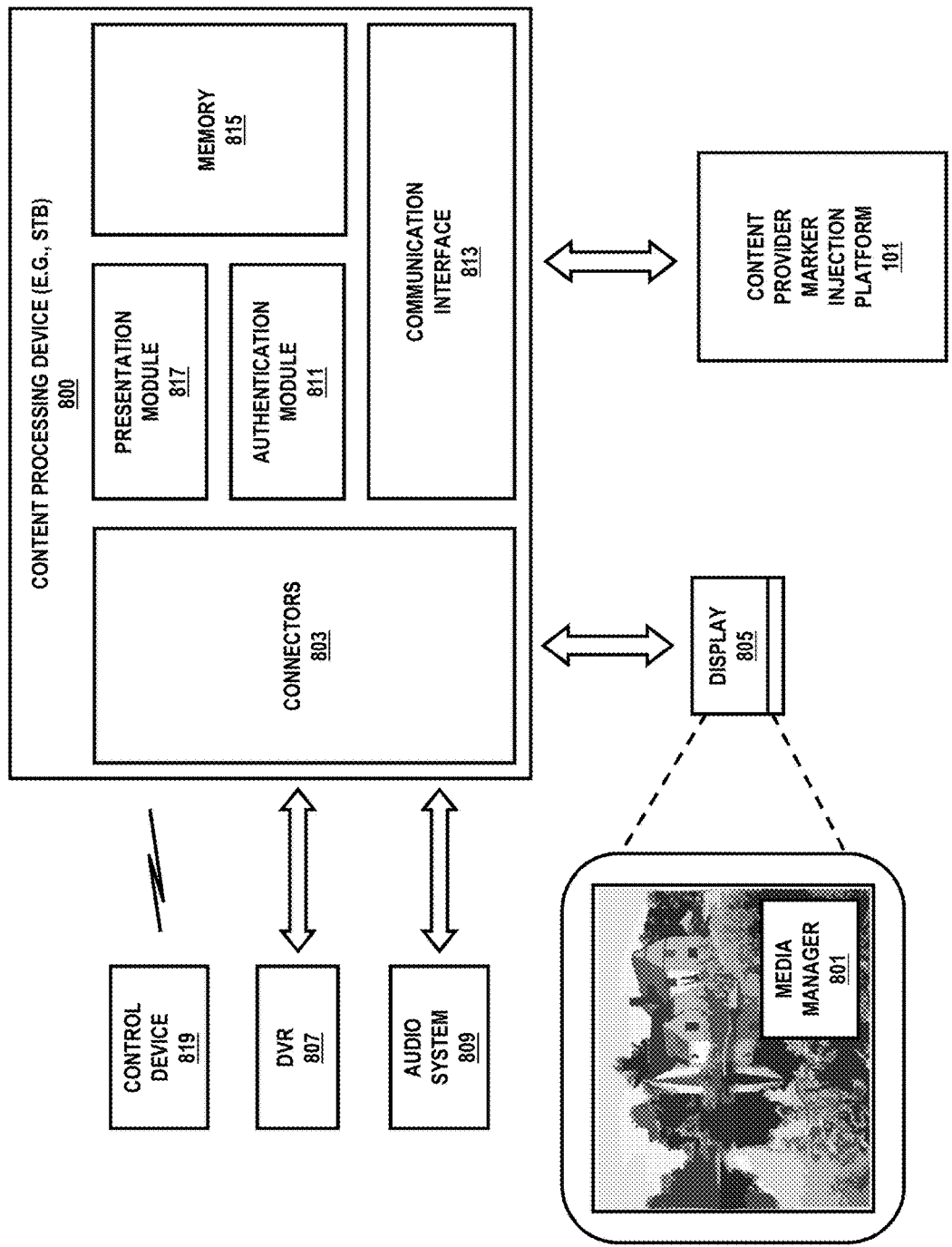
FIG. 8 is a diagram of a content processing device (e.g., set-top box) configured to facilitate determining content program time boundaries, according to an exemplary embodiment.

FIG. 8 is a diagram of a content processing device 800, according to an exemplary embodiment. Content processing device (or device) 800 (e.g., content processing device 103, STB 201, system 300, etc.) may comprise computing hardware (such as described with respect to FIGS. 10 and 11), as well as include one or more component configured to execute the processes describe herein for facilitating efficient techniques to accurately determine content program time boundaries. Device 800 may comprise any suitable technology to retrieve one or more content streams from a media source, such as media service provider 119 and one or more third-party content provider systems 115. The content streams include media content retrieved over one or more data networks (e.g., networks 105 and/or 107), in response to commands from one or more media applications (e.g., media manager 801).

According to various embodiments, device 800 may also include inputs/outputs (e.g., connectors 803) to display 805 and DVR 807 (e.g., DVR 109), as well as to audio system 809. In particular, audio system 809 may comprise a conventional audio-video receiver capable of monaural or stereo sound, as well as multichannel surround sound. Audio system 809 may include speakers, ear buds, headphones, or any other suitable component configured for personal or public dissemination. As such, device 800, display 805, DVR 807, and audio system 809, for example, may support high resolution audio and/or video streams, such as high definition television (HDTV) or digital theater systems high definition (DTS-HD) audio. Thus, content processing device 800 may be configured to encapsulate data into a proper format with required credentials before transmitting onto one or more of the networks of FIG. 1 and de-encapsulate incoming traffic to dispatch data to display 805 and/or audio system 809.

In an exemplary embodiment, display 805 and/or audio system 809 may be configured with internet protocol (IP) capability (i.e., includes an IP stack, or is otherwise network addressable), such that the functions of device 800 may be assumed by display 805 and/or audio system 809. In this manner, an IP ready, HDTV display or DTS-HD audio system may be directly connected to one or more service provider networks 105 and/or communication networks 107. Although device 800, display 805, DVR 807, and audio system 809 are shown separately, it is contemplated that these components may be integrated into a single component, or other combination of components.

An authentication module 811 may be provided by device 800 to initiate or respond to authentication schemes of, for instance, service provider network 105, third-party content provider systems 115, or various other content providers, e.g., television broadcast systems 117, etc. Authentication module 811 may provide sufficient authentication information, e.g., a user name and password, a key access number, a unique machine identifier (e.g., MAC address), and the like, as well as combinations thereof, to a corresponding communications (or network) interface 813 for establishing connectivity, via LAN 123, and to service provider platform 101a. Authentication at device 800 may identify and authenticate a second device (e.g., computing device 121) communicatively coupled to, or associated with, content processing device 800, or vice versa. Further, authentication information may be stored locally at memory 815, in a repository (not shown) connected to device 800.

Authentication module 811 may also facilitate the reception of data from single or disparate sources. For instance, content processing device 800 may receive broadcast video from a first source (e.g., MSP 119), signals from a media application at second source (e.g., computing device 121), and a media content stream from a third source accessible over communication networks 107 (e.g., third-party content provider system 115). As such, display 805 may present the broadcast video, media application, and media content stream to the user, wherein device 800 (in conjunction with one or more media applications) can permit users to experience various sources of media content traditionally limited to the data domains. This presentation may be experienced separately, concurrently, in a toggled fashion, or with zooming, maximizing, minimizing, or trick capabilities, or equivalent mode. In other exemplary embodiments, authentication module 811 can authenticate a user to allow them to interact with one or more third-party subscriber account features associated with third-party content provider systems 115.

Presentation module 817 may be configured to receive media content streams (e.g., audio/video feed(s) including media content retrieved over a data network) and output a result via one or more connectors 803 to display 805 and/or audio system 809. In this manner, presentation module 817 may also provide a user interface for a media application via display 805. Aural aspects of media applications may be presented via audio system 809 and/or display 805. In certain embodiments, media applications, such as media manager 801, may be overlaid on the video content output of display 805 via presentation module 817. The media content streams may include content received in response to user input specifying media content that is accessible by way of one or more third party content provider systems 115 and, thereby, available over at least one data network (e.g., network 105 and/or 107), wherein the media content may be retrieved and streamed by device 800 for presentation via display 805 and/or audio system 809. Accordingly, presentation module 817 may be configured to provide lists of search results and/or identifiers to users for selection of media content to be experienced. Exemplary search results and/or identifiers may include graphical elements, channels, aural notices, or any other signifier, such as a uniform resource locator (URL), phone number, serial number, registration number, MAC address, code, etc.

Connector(s) 803 may provide various physical interfaces to display 805, audio system 809, as well as other peripherals; the physical interfaces may include, for example, RJ45, RJ11, high definition multimedia interface (HDMI), optical, coax, FireWire, wireless, and universal serial bus (USB), or any other suitable connector. The presentation module 817 may also interact with control device 819 for determining particular media content that a user desires to experience. In an exemplary embodiment, control device 819 may comprise a remote control (or other access device having control capability (e.g., computing device 121), a wireless user device, mobile phone, etc.) that provides users with the ability to readily manipulate and dynamically modify parameters affecting the media content being viewed. In other examples, device 800 may be configured for voice recognition such that device 800 may be controlled with spoken utterances.

In this manner, control device 819 may include (not shown) a cursor controller, trackball, touch screen, touch pad, keyboard, and/or a key pad for activating a media application, navigating through broadcast channels, search results, and/or media content identifiers, as well as performing other control functions. For instance, control device 819 may be utilized to maximize a media application, navigate through displayable interfaces, locate/specify/retrieve media content, modify content processing device 800 parameters, or toggle through broadcast channels and/or media content identifiers. Control device 819 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Figure 9:
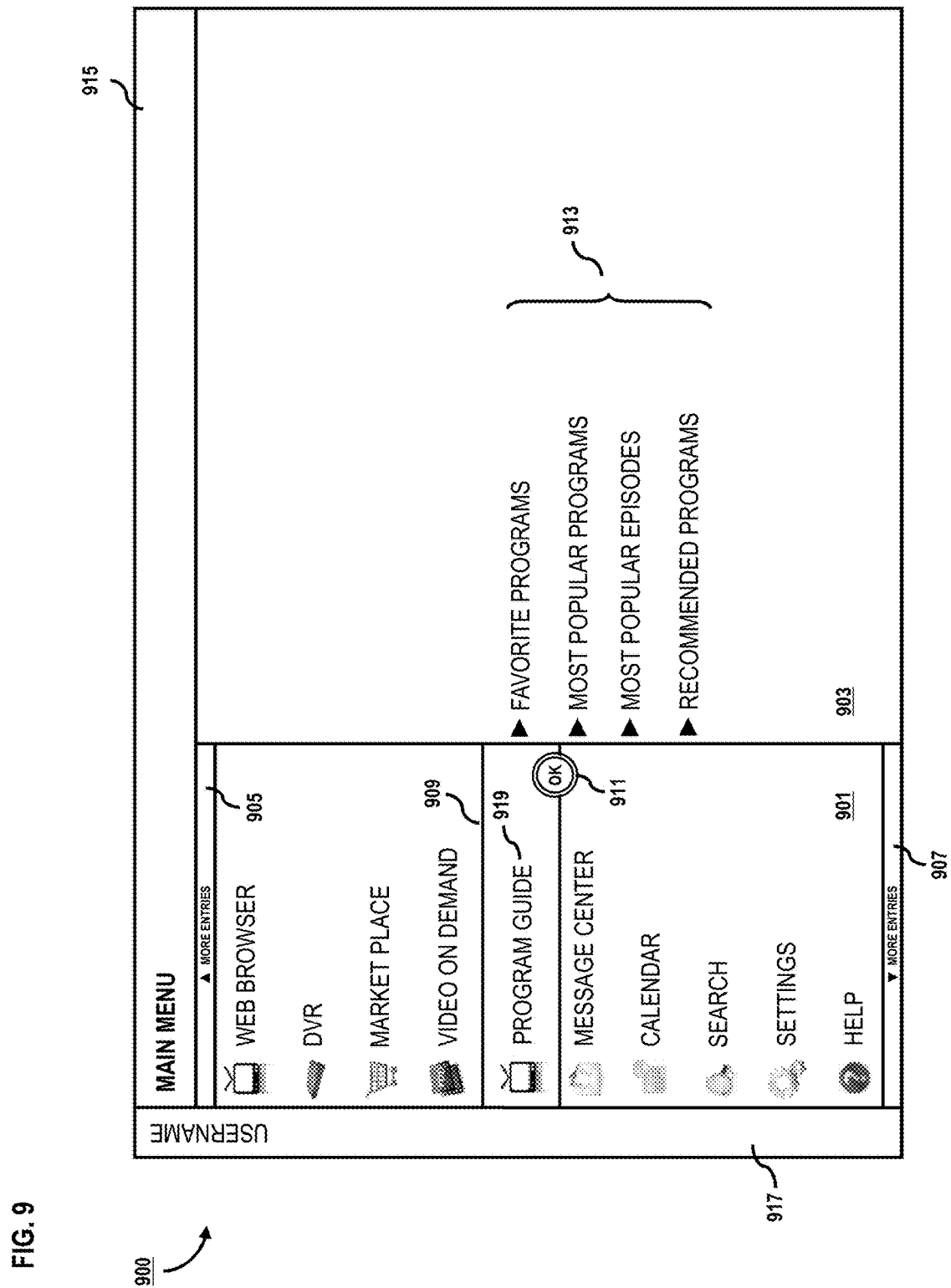
FIG. 9 is a diagram of a graphical user interface (GUI) presented via a set-top box for providing for the selection or programs to record from a live stream with marker metadata, according to an exemplary embodiment.

FIG. 9 is a diagram of a graphical user interface (GUI) presented via a set-top box for providing various options for managing DVR operations, according to an exemplary embodiment. GUI (or main menu) 900 may be evoked using a number of different methods. For example, a user may select a dedicated "MENU" button on control device 819 or a peripheral device communicatively coupled thereto, such as computing device 121, a mobile handset (not shown), and the like. It is recognized that any other suitable actuator of these devices may be additionally, or alternatively, used to access the functionality of main menu 900, such as triggering a "GUIDE" icon. Further, main menu 900 may be evoked by selecting an option within another interface or application, such as, for example, when navigating from a public screen (or navigational shell) to a user-specific screen, i.e., a private screen. As such, an executing device (e.g., device 800, computing device 121, etc.) may require sufficient authentication information (e.g., username and password, etc.) to be input in order to access the functions of main menu 900.

As seen in FIG. 9, GUI 900, providing a "main menu," may include one or more interactive viewing panes, such as panes 901 and 903. In particular embodiments, as will be described in more detail below, the content of pane 903 may be dynamically updated to display various menu options, interaction elements, information, etc., related to user interaction within pane 901, and vice versa. In this example, however, pane 901 includes a listing of selectable entries corresponding to one or more features (or options) that may be provided via content processing device 900. For example, entries may include: program guide options, DVR options, marketplace (or shopping) options, on-demand programming options, media manager options, messaging and communications options, searching options, setting options, help options, and the like. In certain embodiments, graphical elements may be provided to correspond to one or more of these entries and, as a result, may be correspondingly displayed therewith.

One or more header 905 and footer 907 fields may be provided and configured to indicate the existence of additional entries not displayed, but navigably available. Accordingly, users may browse through the entries of user interface 900 via, for instance, control device 819 associated with device 800. Further, GUI 900 may include one or more fixed focus states (such as border 909) and/or distinctive magnification features, e.g., color, brightness, bolding, font type, text size, etc., that may be used to convey a "currently" navigated position. In this manner, when a user navigates to a desired entry, actuation of, for instance, an "OK" button on control device 819 may launch (or evoke) corresponding features and/or applications associated with the particular entry. According to some embodiments, an interactive "OK" option 911 may be utilized.

Moreover, main menu 900 may include one or more additional user options 913, when a user navigates to a particular entry. As shown in user options 913, the options allow users to select listings of media content, such as favorite programs, most popular programs, most popular episodes, recommended programs, and the like. These options correspond to certain of the functions of device 800, as described in FIG. 7. In other (or additional) embodiments, one or more aural descriptions of an entry "currently" navigated to and methods of interaction may be provided.

In certain other exemplary embodiments, main menu 900 may provide one or more navigation fields 915 and 917 to facilitate usability. For example, field 915 may provide the name of the function/option being accessed, e.g., "MAIN MENU." In this manner, when a user accesses a new function/option, field 915 may be automatically (or dynamically) updated. Field 917 may be utilized to indicate a user profile "currently" authenticated to system 100, e.g., "USERNAME." Thus, a user may access one or more features and/or functions associated with the DVR and/or device 800 by navigating to and selecting (or otherwise interacting with) entry 919 of main menu 900.

The processes described herein for managing digital video recorders may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
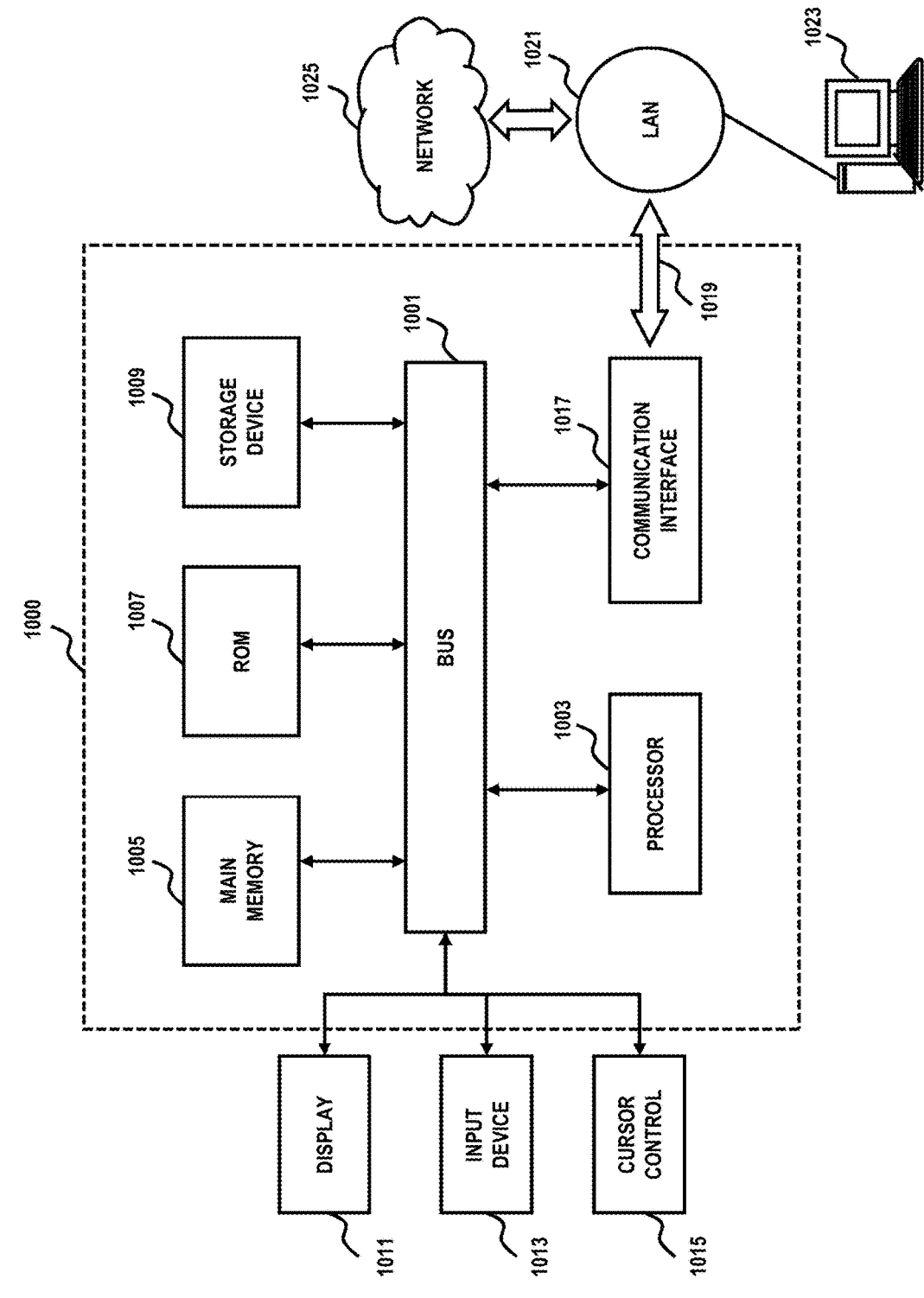
FIG. 10 is a diagram of a computer system that can be used to implement various exemplary embodiments.

FIG. 10 illustrates computing hardware (e.g., computer system) 1000 upon which an embodiment according to the invention can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to computer-readable storage media ((or non-transitory media)—i.e., non-volatile media and volatile media), and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
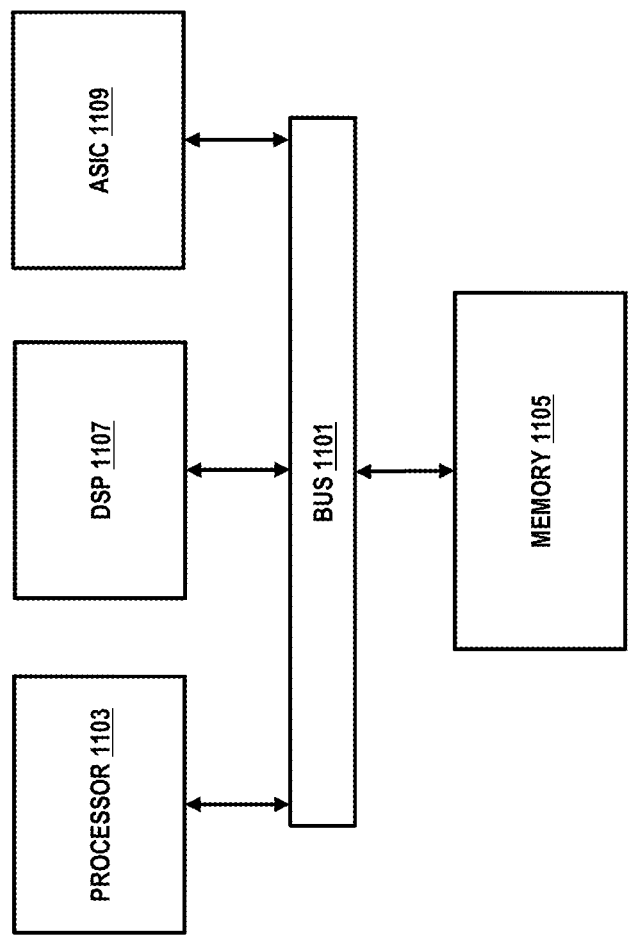
FIG. 11 is a diagram of a chip set that can be used to implement various exemplary embodiments.

FIG. 11 illustrates a chip set 1100 upon which an embodiment of the invention may be implemented. Chip set 1100 is programmed to present a slideshow as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of FIGS. 2, 3, and 7-9.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
 receiving, by a content processing device, a first live media stream,
  a plurality of markers being included in the first live media stream, and
  the plurality of markers being metadata injected into the first live media stream by a service provider platform or a content provider platform;
 detecting, by the content processing device, a presence of the plurality of markers within the first live media stream,
  the metadata being stored in a schedule metadata log and accessible by a scheduler, and
  the plurality of markers being used to separate supplemental content within program content of the first live media stream,
   first markers, of the plurality of markers, being used to identify a first type of supplemental content, and
   second markers, of the plurality of markers, being used to identify a second type of supplemental content;
 detecting, by the content processing device, a presence of third markers in the plurality of markers indicating a modified start time and a modified end time for the program content;
 notifying, by the content processing device and based on the presence of the third markers, the scheduler of the presence of the third markers to trigger beginning of recording and ending of recording, by a digital video recorder, of the first live media stream,
  the beginning of recording of the first live media stream being triggered at the modified start time, and
  the ending of recording of the first live media stream being triggered at the modified end time;
 determining, by the content processing device, whether a currently tuned channel corresponds to a channel, specified by a particular schedule, on which one or more live media streams are to be recorded,
  a tuner being allocated to the channel when the currently tuned channel does not correspond to the channel;
 triggering, by the content processing device, recording of the first live media stream based on the tuner being allocated to the channel,
  the program content being recorded,
  first supplemental content, identified by the first markers, being recorded, and
  second supplemental content, identified by the second markers, not being recorded; and
 selectively triggering, by the content processing device, recording of a program in a second live media stream according to the particular schedule based on determining that the plurality of markers are not detected within the second live media stream.

2. The method of claim 1, wherein the plurality of markers include:
 a start marker specifying a start of the program content, and
 an end marker specifying an end of the program content.

3. The method of claim 1, wherein the first markers include:
 a first particular marker specifying a start of the first supplemental content, and
 a second particular marker specifying an end of the first supplemental content.

4. The method of claim 1, wherein at least one marker, of the plurality of markers, is injected into the first live media stream during a time not used by the program content.

5. The method of claim 1, wherein a start of the program content and an end of the program content are determined using out-of-band scheduling metadata.

6. The method of claim 1, further comprising:
 determining a status of recording resources; and
 where trigger recording of the first live media stream comprises:
  triggering recording of the first live media stream based on determining the status of recording resources.

7. A device comprising:
 one or more processors to:
  receive a first live media stream,
   a plurality of markers being included in the first live media stream, and
   the plurality of markers being metadata injected into the first live media stream by a service provider platform or a content provider platform;
  detect presence of the plurality of markers within the first live media stream,
   the metadata being stored in a schedule metadata log accessible by a scheduler, and
   the plurality of markers being used to identify supplemental content within program content in the first live media stream,
    first markers, of the plurality of markers, being used to identify a first type of supplemental content, and
    second markers, of the plurality of markers, being used to identify a second type of supplemental content;
  detect a presence of third markers, of the plurality of markers, indicating a modified start time and a modified end time for the program content;
  notify, based on the presence of the third markers, the scheduler of the presence of the third markers to trigger recording, by a digital video recorder, of the first live media stream,
   a beginning of recording of the first live media stream being triggered at the modified start time, and
   an ending of recording of the first live media stream being triggered at the modified end time;
  determine whether a currently tuned channel corresponds to a channel, specified by a particular schedule, on which one or more live media are to be recorded, a tuner being allocated to the channel when the currently tuned channel does not correspond to the channel;
  trigger recording of the first live media stream based on the tuner being allocated to the channel,
   the program content being recorded,
   first supplemental content, identified by the first markers, being recorded, and
   second supplemental content, identified by the second markers, not being recorded; and
  selectively trigger recording of a program in a second live media stream according to the particular schedule based on determining that the plurality of markers are not detected within the second live media stream.

8. The device of claim 7, wherein the plurality of markers include:
   a start marker specifying a start of the program content, and
   an end marker specifying an end of the program content.

9. The device of claim 7, wherein the second markers include:
   a first particular marker specifying a start of the second supplemental content, and
   a second particular marker specifying an end of the second supplemental content.

10. The device of claim 7, wherein at least one marker, of the plurality of markers, is injected into the first live media stream during a time not used by the program content.

11. The device of claim 7, wherein the first supplemental content includes at least one of:
   emergency broadcasts; or
   urgent news.

12. The device of claim 7, wherein the second supplemental content includes at least one of:
   advertisements; or
   promotions.

13. The device of claim 7, wherein the plurality of markers are injected into the first live media stream via a frequency channel not used by program content.

14. A non-transitory computer-readable medium storing instructions, the instructions comprising:
   one or more instructions that, when executed by one or more processors, cause the one or more processors to:
      receive a first live media stream,
         a plurality of markers being included in the first live media stream, and
         the plurality of markers being metadata injected into the first live media stream by a service provider platform or a content provider platform;
      detect presence of the plurality of markers within the first live media stream,
         the metadata being stored in a schedule metadata log and accessible by a scheduler, and
         the plurality of markers being used to identify supplemental content within program content of the first live media stream,
            first markers, of the plurality of markers, being used to identify a first type of supplemental content, and
            second markers, of the plurality of markers, being used to identify a second type of supplemental content;
      detect a presence of third markers in the plurality of markers indicating a modified start time and a modified end time for the program content;
      notify, based on the presence of the third markers, the scheduler of the presence of the third markers to trigger recording, by a digital video recorder, of the first live media stream,
         a beginning of recording of the first live media stream being triggered at the modified start time, and
         an ending of recording of the first live media stream being triggered at the modified end time;
      determine whether a currently tuned channel corresponds to a channel, specified by a particular schedule, on which one or more live media streams are to be recorded,
         a tuner being allocated to the channel based on the currently tuned channel not corresponding to the channel;
      trigger recording of the first live media stream based on the tuner being allocated to the channel,
         the program content being recorded,
         first supplemental content identified by the first markers being recorded, and
         second supplemental content identified by the second markers not being recorded; and
      selectively trigger recording of a program in a second live media stream according to the particular schedule based on determining that the plurality of markers are not detected within the second live media stream.

15. The non-transitory computer-readable medium of claim 14, wherein the first supplemental content includes at least one of:
   emergency broadcasts; or
   urgent news.

16. The non-transitory computer-readable medium of claim 14, wherein the second supplemental content includes at least one of:
   emergency broadcasts; or
   urgent news.

17. The non-transitory computer-readable medium of claim 14, wherein the plurality of markers are injected into the first live media stream during a time not used by program content.

18. The non-transitory computer-readable medium of claim 14, wherein a start time of the program content and an end time of the program content are based on out-of-band metadata; and
   wherein schedule metadata is updated based on in-band metadata.

19. The non-transitory computer-readable medium of claim 18, wherein the out-of-band metadata includes an electronic program guide.

20. The non-transitory computer-readable medium of claim 14, wherein the plurality of markers are detected without having the tuner allocated to the channel.

* * * * *

UNITED STATES PATENT AND TRADEMARK OFFICE
CERTIFICATE OF CORRECTION

| | |
|---|---|
| PATENT NO. | : 9,955,113 B2 |
| APPLICATION NO. | : 13/415260 |
| DATED | : April 24, 2018 |
| INVENTOR(S) | : Narendra B. Babu et al. |

Page 1 of 1

It is certified that error appears in the above-identified patent and that said Letters Patent is hereby corrected as shown below:

On the Title Page

Item (75) Inventors; the forth named inventor should read as follows:
"Franklin JACQUES, Tamil Nadu (IN)"

Signed and Sealed this
Twenty-fifth Day of June, 2019

Andrei Iancu
*Director of the United States Patent and Trademark Office*